Nov. 24, 1970   R. L. ENSMINGER ET AL   3,543,095

PHOTOCATHODE PROTECTION CIRCUIT

Filed Nov. 5, 1968

INVENTORS
RICHARD L. ENSMINGER
ROBERT F. HOWARTH
BY
ATTORNEYS

United States Patent Office 3,543,095
Patented Nov. 24, 1970

3,543,095
PHOTOCATHODE PROTECTION CIRCUIT
Richard L. Ensminger, San Diego, and Robert F. Howarth, La Mesa, Calif., assignors, by mesne assignments, to the United States of America as represented by the Secretary of the Navy
Filed Nov. 5, 1968, Ser. No. 773,487
Int. Cl. H02h 7/20; H01j 39/12
U.S. Cl. 317—51                                6 Claims

ABSTRACT OF THE DISCLOSURE

A photocathode protection circuit applicable to high voltage electron multiplier devices is disclosed. The protection circuit features the positive firing action of a silicon controlled rectifier (SCR). The firing point of the SCR is set such that protection actuation occurs when the photocathode current is of a predetermined maximum magnitude. Firing of the SCR actuates a relay which transfers the photocathode from its most negative potential with respect to the electrode potential to a more positive potential. In such a potential state, the photocathode is effectively reverse biased and electron flow is prevented irrespective of the magnitude of incident light flux. The state of the protection circuit is indicated by a neon lamp indicating circuit. Photocathode current calibration and monitoring apparatus are also provided.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

When working with photosensitive devices, such as multiplier tubes, it is often desirable to have some means of preventing excessive photocathode current due to inadvertent flooding of the photocathode with light flux. Such inadvertent flooding can occur, for example, when an illumination source is set too bright, when a camera is "panned" across a lamp, or when a lens iris is opened too much. Permanent damage or destruction of the photo device can result from such accidents.

A number of protective circuits have been developed for protecting multiplier tubes. The prior art protective circuits, however, have disadvantages and limitations which make them unacceptable and unreliable for the protection of new, highly complex, and expensive multiplier phototubes. In a prior art protective circuit for multiplier tubes, a diode has been employed to shunt excessive current away from the tube. In another prior art protective circuit a parallel combination of a fuse, resistor, and a glow tube has been used to shunt the bias of a tube after a protective fuse has blown due to excessive current. None of the prior art protective circuits, however, teach one or more of the following required circuit characteristics: (a) a complete opening of the phototube circuit; (b) phototube current cut-off by reverse biasing; (c) calibration and monitoring features of phototube current; (d) positive firing action by silicon controlled rectifiers to protect the phototube.

SUMMARY OF THE INVENTION

The present invention comprises a photocathode protection circuit for preventing permanent damage to or destruction of photosensitive devices which can result from inadvertent flooding of the photocathode with light flux. The protective circuit is applicable to high voltage electron multiplier devices such as image orthicons, image dissectors, or any other multiplier phototubes.

The protective action of the circuit is made to occur when the photocathode current is of a predetermined maximum magnitude. This is done by setting the firing point of a silicon controlled rectifier to correspond with a signal derived from the photocathode current. Firing of the SCR energizes a relay which transfers the photocathode from its most negative potential to a more positive potential with respect to the tube electrode. At the more positive potential the photocathode is effectively biased off, and electron flow is prevented irrespective of the incident light flow. A neon tube is actuated by the protective switching and serves as an indication of the state of the protective circuit. Other features include photocathode current calibration and monitoring.

STATEMENTS OF THE OBJECTS OF THE INVENTION

An object of the present invention is to provide a simple and reliable photocathode protection circuit.

Another object of the present invention is to provide a photocathode protection circuit in which the photocathode circuit is completely opened.

Another object of the present invention is to provide a photocathode protection circuit in which photocathode current cut-off is achieved by reverse biasing.

Another object of the present invention is to provide a photocathode protection circuit in which positive firing action for current cut-off is achieved by means of a silicon controlled rectifier circuit.

Another object of the present invention is to provide photocathode protective circuit having calibration and monitoring features for the photocathode current.

Other objects and features of this invention will become apparent through the following detailed description of the invention when considered in conjunction with the accompanying drawings.

DESCRIPTION OF THE PREFERRED EMBODIMENT

Figure 1:
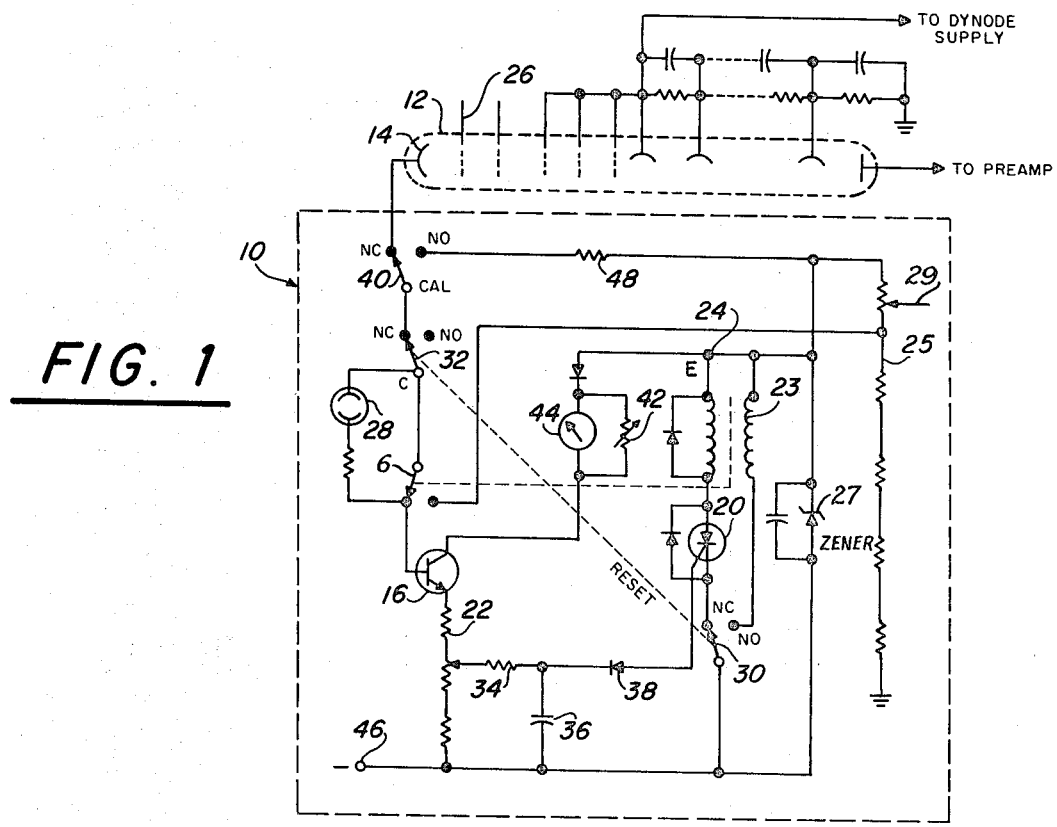
FIG. 1 is a schematic circuit diagram of the photocathode protection circuit of the present invention.

FIG. 1 illustrates a circuit embodying the concept of the present invention. In the illustrated example, photocathode protection circuit 10 is arranged to protect multiplier phototube 12 from excessive current from photocathode 14 due to inadvertent flooding of the photocathode with light flux. By a proper selection of components for the circuit shown in FIG. 1, the protective action can be made to occur at maximum photocathode currents from a few tenths of a microampere to several microamperes. Rearrangement of the emitter resistors of transistor 16 permits extension of this range.

The protective action of the circuit is made to occur when the photocathode current is of a predetermined maximum magnitude. The base of transistor 16 is connected to the photocathode current output so that in the configuration shown in FIG. 1, transistor 16 functions as a current multiplier. The firing point of the silicon controlled rectifier 20 (SCR) is set by adjusting variable resistance control 22. Thus, the combination of transistor 16 and variable resistance means 22 function to derive a trigger-level gate signal for SCR 20. It should be noted that the negative high voltage supply for the photocathode circuit is applied at input terminal 46. Thus the voltage E at point 24 which is connected to terminal 46 through Zener diode 27 represents the most negative potential which is applied to the photocathode 14 since the value of the voltage E is equal to the negative high voltage supply less the drop across the Zener diode 27. Firing SCR 20 energizes relay 23, which by the action of switch 6 which is associated with relay 23 transfers the photocathode from its most negative potential E at point 24 to a more positive voltage, for example, 0.8 E at point 25. Voltage 0.8 E at point 25 is obtained by selectively adjusting the potentiometer 29. Since photocathode 14 is now more positive than the electrode 26 voltage, the photocathode 14 is effectively reverse biased. Electron flow is thus prevented irrespective of the incident light flux. Neon tube 28 is actuated by the protective switching and serves as a visual indication of the state of the protection circuit.

Because of its permanent magnet armature construction, relay 23 remains in the protective position until it is reset by manually actuating switch 30 to the N.O. or normally open position. With switch 30 manually reset to the normally open position current flows through relay 23 which is a latching relay to thereby reset it to the original state. The N.O. or normally open position of switch 32 functions to provide an open circuit when such a condition is required or desired. After resetting, the circuit remains in the normal operation mode or else it immediately trips, depending on the magnitude of the photocathode current.

Switches 30 and 32 are separate, mechanically ganged, microswitches which are adjusted so that when initially pressed, switch 32 opens before switch 30 opens; when depressed, switch 30 closes before switch 32 closes. Thus, the protective SCR 20 is armed so that it is ready to function before the photocathode circuit 10 is closed through switch 32.

Resistor 34 and capacitor 36 shown in the SCR 20 gate circuit act as a low-pass filter to prevent undesired firing of SCR 20 as when the photocathode is being uncapped. Zener diode 38 prevents firing of the SCR by providing a preselected offset or bias voltage which must be overcome before SCR 20 will fire.

Utilizing a voltage divider which is usually available (although not shown in FIG. 1) when operating the phototube 12, a known current can be made to flow in the base circuit of transister 16 by setting switch 40 to the N.O. position (CAL). Resistor 42 is then adjusted to set the meter 44 at the desired deflection. Circuit stability and calibration can then be periodically checked as desired merely by depressing switch 40 to the N.O. position. This check is possible since the negative high voltage supply at point 46 is well regulated and "current determining" resistor 48 is a reasonably stable component.

Any changes in transistor 16 parameters can thus be easily detected by this check, and the value of resistor 42 can be varied as needed to adjust the meter 44. Resistor 48 is chosen such that the known base current is somewhat less than the "trip current." Hence the protective action does not occur when checking calibration. Although the calibration per se is made at one point, for example, at 1.0 microamps, the linearity of the combination of transistor 16 and meter 44 can be within, for example, ±5% of full scale over a 0 to 1.5 $\mu$a. operating range of the protection circuit. Normal photocathode operating current can be 1.0 $\mu$a. with a trip current of 1.4 $\mu$a.

Meter 44 also serves to indicate the average photocathode current, and during normal operation it can provide for a current sensitivity, for example, of 5 $\mu$a. full scale at a point in the circuit that is 2850 v. negative with respect to ground.

Figure 2:
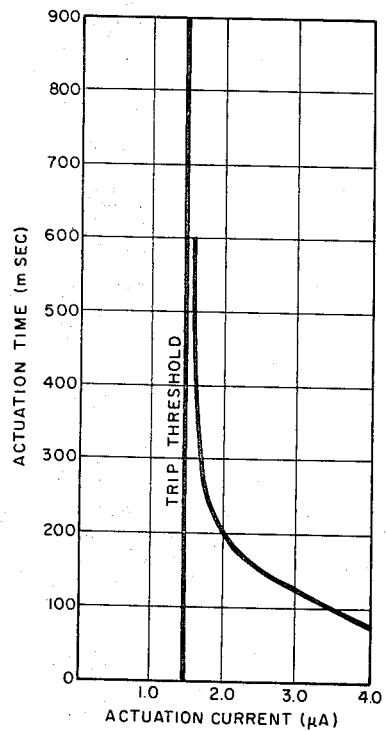
FIG. 2 is a graphical representation of actuation time of the protection circuit as a function of actuation current.

The speed of operation of the protection circuit is shown in detail FIG. 2. Actuation current is the sum of photocathode current plus socket leakage and dark current. Although not the ultimate in speed, operation is fast enough to greatly minimize the possibility of ion damage to photocathode surfaces. For an image dissector, for example, the probability of ion damage is proportional to the magnitude-time product of photocathode current. In many cases a larger than normal current is not detrimental, but if maintained for a period of time the large current flow would shorten tube life. A similar situation is true with potentially dangerous amounts of light flux; that is, the overload must exist for some minimum time before permanent damage results. Generally, no permanent deleterious effects to the phototubes result because of the activation time of the protection circuit.

Excessive leakage and intermittent arcing can occur through the jumbo annular socket (not shown) of the phototube. When this occurs, the protection circuit is activated, and the operator is made aware of an overload condition. Since the magnitude of the socket leakage is usually small compared to the current capacity of the high voltage supply (but not small compared to the photocathode current), it initially causes no damage nor actuates the power supply overload. However, a heretofore safe value of light-flux induced current, when added to the increased leakage current, will not actuate the protection circuit. This undesired leakage shows a tendency to increase and to occasionally arc; hence the action of the protection circuit in signalling this condition is very helpful.

Obviously many modifications and variations of the present invention are possible in the light of the above teachings. It is, therefore, to be understood that within the scope of the disclosed concept, the invention may be practiced otherwise than as specifically described.

What is claimed is:
1. A photocathode protection circuit comprising:
    (a) a photosensitive electron multiplier tube having a photocathode and a plurality of electrodes;
    (b) a high voltage supply connected to said photocathode to provide a negative potential at said photocathode with respect to said electrodes;
    (c) current multiplier means connected to the current output of said photocathode for deriving a trigger-level gate signal when said current output is of a predetermined maximum magnitude;
    (d) controlled switch means connected to the output of said current multiplier means, said switch means being in a normally nonconductive state and adapted to switch to a conductive state when said trigger-level gate signal is applied to the gate terminal of said controlled switch means; and
    (e) electromagnetic circuit breaker means responsive to said controlled switch means to transfer said photocathode to a positive potential with respect to said electrodes when said controlled switch means is in a conductive state.

2. The circuit of claim 1 wherein said current multiplier means comprises a transistor, the base of said being transistor connected to said current output and the emitter of said transistor being connected to variable resistance means for deriving said trigger-level gate signal.

3. The circuit of claim 1 wherein said controlled switch means comprises a silicon-controlled rectifier.

4. The circuit of claim 1 wherein said electromagnetic circuit breaker means comprises a relay.

5. The circuit of claim 1 further comprising lamp indicating means for indicating the state of said protection circuit.

6. The circuit of claim 1 further comprising calibration means for adjusting and monitoring current flow through said base of said transistor with said photocathode disconnected from said high voltage supply.

References Cited

UNITED STATES PATENTS

| | | | |
|---|---|---|---|
| 2,290,775 | 7/1942 | Snyder | 250—207 X |
| 2,846,591 | 8/1958 | Valeton | 328—9 X |

J D MILLER, Primary Examiner

H. FENDELMAN, Assistant Examiner

U.S. Cl. X.R.

250—207; 317—33, 130; 328—8